(12) United States Patent
Andrade

(10) Patent No.: US 9,345,330 B2
(45) Date of Patent: May 24, 2016

(54) CHAIR OR OTHER PIECE OF FURNITURE AND METHOD OF MAKING SAME

(71) Applicant: Jose Bernardo Andrade, Richmond Hill (CA)

(72) Inventor: Jose Bernardo Andrade, Richmond Hill (CA)

(*) Notice: Subject to any disclaimer, the term of this patent is extended or adjusted under 35 U.S.C. 154(b) by 71 days.

(21) Appl. No.: 13/790,958

(22) Filed: Mar. 8, 2013

(65) Prior Publication Data

US 2014/0252819 A1 Sep. 11, 2014

(51) Int. Cl.
| | |
|---|---|
| A47C 4/02 | (2006.01) |
| A47C 5/12 | (2006.01) |
| A47C 7/62 | (2006.01) |
| A47C 11/00 | (2006.01) |
| A47C 4/03 | (2006.01) |
| A47C 31/11 | (2006.01) |

(52) U.S. Cl.
CPC ... *A47C 5/12* (2013.01); *A47C 4/03* (2013.01); *A47C 7/62* (2013.01); *A47C 11/00* (2013.01); *A47C 31/11* (2013.01); *A47C 4/02* (2013.01); *Y10T 29/49826* (2015.01)

(58) Field of Classification Search
CPC .............. A47C 4/02; A47C 4/03; A47C 11/00
USPC ........ 297/218.1, 218.5, 218.3, 228.1, 440.14, 297/440.11, 451.8, 440.23, 440.15
See application file for complete search history.

(56) References Cited

U.S. PATENT DOCUMENTS

| | | | |
|---|---|---|---|
| 3,955,850 A * | 5/1976 | Toso | A47C 3/16 108/64 |
| 4,694,511 A | 9/1987 | Estes et al. | |
| 4,697,847 A * | 10/1987 | Herschlag | 297/440.1 |
| 4,883,317 A * | 11/1989 | Davenport | 297/188.1 |
| D310,314 S | 9/1990 | Caron | |
| D365,958 S | 1/1996 | Bolewski | |
| 5,509,720 A | 4/1996 | Croom | |
| 5,700,053 A | 12/1997 | Downing | |
| 5,707,107 A | 1/1998 | Melone | |
| D396,983 S | 8/1998 | Taylor | |
| D458,073 S | 6/2002 | Spitzer | |
| 6,540,302 B1 | 4/2003 | Crocker et al. | |
| 6,568,058 B1 * | 5/2003 | Wieland et al. | 29/91.1 |
| 6,857,649 B2 * | 2/2005 | Patton | 280/250.1 |
| 6,948,771 B1 | 9/2005 | Salandy | |
| 7,108,330 B2 * | 9/2006 | Mizelle et al. | 297/452.57 |
| 7,168,760 B2 | 1/2007 | Kenny | |
| 7,340,813 B2 | 3/2008 | Hampton et al. | |
| D655,966 S | 3/2012 | Roychoudhury | |
| 2012/0267929 A1 * | 10/2012 | Donley | 297/311 |
| 2014/0138994 A1 * | 5/2014 | Wittenberg et al. | 297/228.1 |

* cited by examiner

*Primary Examiner* — Syed A Islam

(74) *Attorney, Agent, or Firm* — Perry + Currier Inc.

(57) ABSTRACT

A chair or other piece of furniture can include a built-up frame including at least a portion of a premade plastic chair, such as an off-the-shelf plastic lawn or deck chair. The frame can have a seat and a backrest shaped to accommodate a person. Cushioning material can be installed over the frame. A cover can be installed over the cushioning material. Another kind of frame including plastic can be used instead of the built-up frame. The cover can be affixed to the frame or can be a removable slip cover. The cover can include sports jersey material and can be made from stock unstitched jersey pieces. A drawer, plush ornament, recess, or sports equipment can be provided at a lower supporting portion of the chair. Feet made of sports equipment can be attached to the bottom of the frame. A backrest opening can receive a piece of sports equipment.

23 Claims, 21 Drawing Sheets

CHAIR OR OTHER PIECE OF FURNITURE AND METHOD OF MAKING SAME

FIELD

The present invention relates to furniture, such as chairs.

BACKGROUND

Furniture, such as chairs, can suffer from a number of problems.

Chairs may be heavy and difficult to rearrange within a room. Lighter chairs may be unsafe for heavy occupants or easy to damage if not treated gently. Chair upholstery is also susceptible to damage or staining by food or drink. These problems can be intensified when chairs or other furniture are used in a sports-viewing environment, such as in a rec. room or bar.

Chairs designed for use by children can suffer from similar problems.

In addition, chairs used in these environments are typically made to be exclusively used as seating and provide little or no other functionality to users.

SUMMARY

According to one aspect of the present invention, a chair or other piece of furniture can include a built-up frame including at least a portion made of plastic, such as a premade plastic chair. The built-up frame can have a seat and a backrest shaped to accommodate at least one seated person. Cushioning material can be installed over the built-up frame. A cover can be installed over the cushioning material.

According to another aspect of the present invention, another kind of frame including plastic can be used instead of a built-up frame.

According to another aspect of the present invention, the cover can be affixed to the frame.

According to another aspect of the present invention, the cover can be a removable slip cover.

According to another aspect of the present invention, the cover can include sports jersey material and can be made from stock unstitched jersey pieces.

According to other aspects of the present invention, one or more of a drawer, plush ornament, recess, and sports equipment can be provided at a lower supporting portion of the chair.

According to another aspect of the present invention, feet made of sports equipment can be attached to the bottom of the frame.

According to another aspect of the present invention, an opening can be provided at the backrest to receive a piece of sports equipment.

According to another aspect of the present invention, a chair includes a frame including a seat and a backrest shaped to accommodate at least one seated person, cushioning material installed over the frame, and a removable slip cover installed over the cushioning material. The removable slip cover can be made of sports jersey material, a jacket, a T-shirt, a tracksuit, or other suitable material.

BRIEF DESCRIPTION OF THE DRAWINGS

The drawings illustrate, by way of example only, embodiments of the present disclosure.

DETAILED DESCRIPTION

The term chair as used in this disclosure is not limited to furniture that seats a single person and may be taken to mean a piece of furniture that seats more than one person (e.g., a loveseat, sofa, etc).

Figure 1:
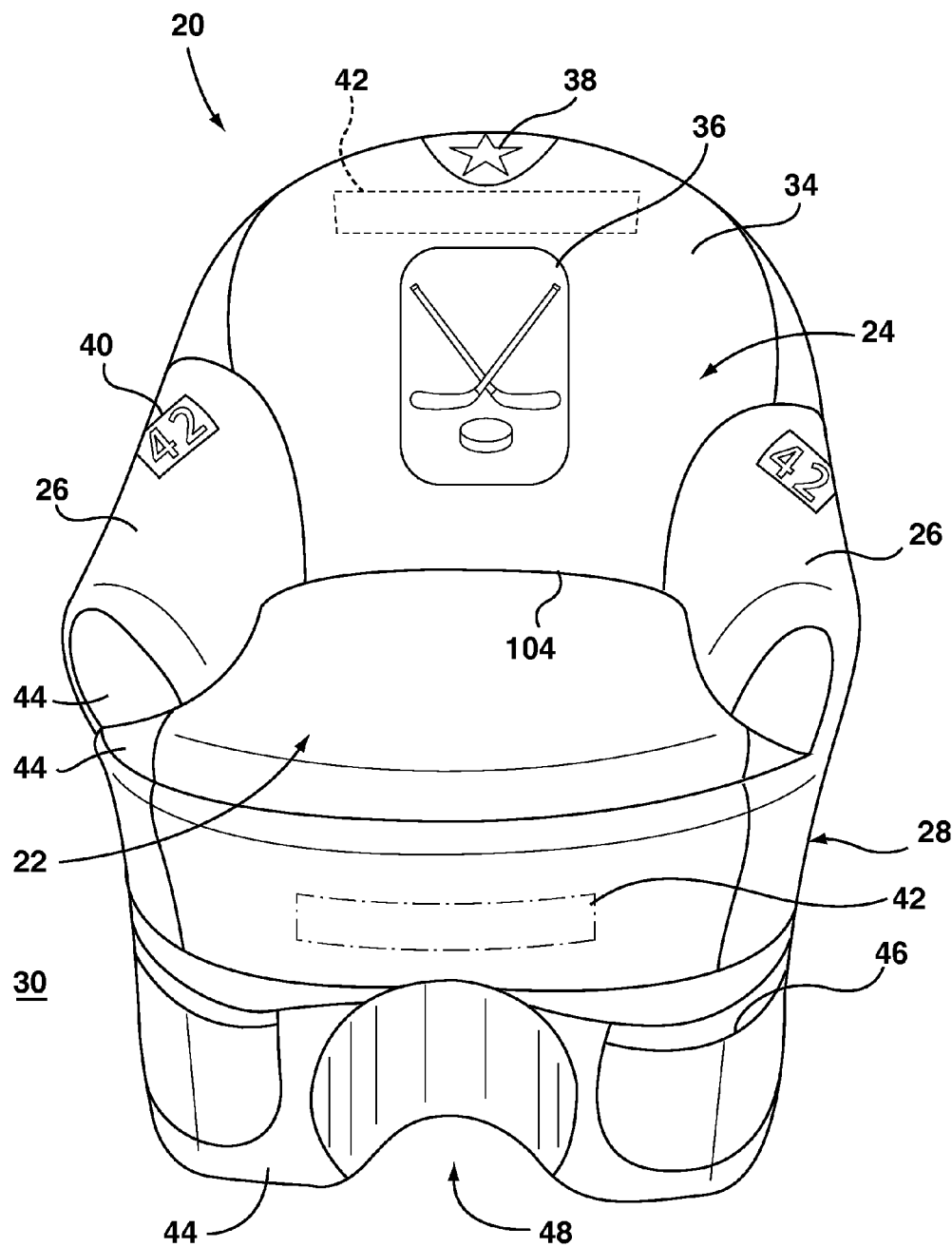
FIG. 1 is a perspective view of a chair according to an embodiment of the present invention.

With reference to FIG. 1, a chair 20 includes a seat 22, a backrest 24, armrests 26, and a lower supporting portion 28, which supports the seat 22, backrest 24, and armrests 26 above the floor 30 when the chair 20 is set upright on the floor 30, as depicted.

The seat 22 and backrest 24 are shaped to accommodate at least one seated person. The chair 20 can shaped and sized to accept any size of occupant, such as a large adult or a small child.

The armrests 26, in this embodiment, are formed as continuous with the seat 22 and backrest 24, such that no opening exists between the armrests 26 and the seat 22 or backrest 24. The seat 22 and backrest 24 are similarly continuous. This may have the advantage of reducing or preventing the risk of injury, such as injury that may occur if a child were to have a body part become lodged in such an opening. Lack of such openings may also make the chair 20 easier to clean.

The chair 20 includes a cover 34 that may be made of any suitable fabric. In some embodiments, the cover 34 is made of upholstery fabric. In this embodiment, the cover 34 is made of sports jersey material. Sports jersey material may include one or more materials such as nylon, polyester, cotton, blends of such materials, and the like. Sports jersey material may be wholly or partially formed of one or more layers of mesh. Moreover, the cover 34 need not be homogenous, but can include different types of sports jersey materials used together. Using sports jersey material for the cover 34 may advantageously result in the cover 34 having increased toughness, durability, breathability, stain resistance, and tear or cut resistance. In other embodiments, other materials, such as upholstery fabric, can be used for the cover 34.

The cover 34 may further include a team logo 36, a sports league logo 38, a player number 40, a player name 42 (on the back of the chair, hidden; or on the front of the lower portion 28), and other visual elements 44 of sports jerseys, such as portions of team color, contrasting color, and similar. The locations shown are examples, and the logos 36, 38, player number and name 40, 42, and other visual elements 44 can be placed at various locations on the cover 34. For example, player number 40 and/or name 42 can be placed on the seat 22 surface. Further, each of these elements 36-44 can be individually included or omitted for a particular cover 34. In this way, the cover 34 can be used to display a sports jersey or elements thereof, while also serving a useful function by protecting the chair 20.

The cover 34, in this embodiment, is made from stock unstitched jersey pieces available from jersey manufacturers as intermediate pieces during the jersey manufacturing process. This can advantageously save the effort of having to unstitch seams of a finished, off-the-shelf jersey. Moreover, this can improve the appearance of the cover 34 because there is less risk of fraying the edges of the jersey pieces or otherwise damaging the jersey as there may tend to be when unstitching a finished jersey. However, in other embodiments, the cover 34 may include jersey pieces obtained from unstitching a finished jersey.

The cover 34 on its exterior may include one or more pockets 46 for storing items, such as snacks or drinks, within reach of the person seated on the chair 20. In this embodiment, each of several pockets 46 is formed by an additional layer of cover material and is located at the supporting portion 28, specifically, at the lower front corners of the chair 20. One or more pockets 46 can be included at other locations on the chair 20, such as the side or the back, in addition to or instead of pockets 46 at the front lower corners of the chair 20.

The chair 20 may further include a feature 48, such as a drawer, recess, plush ornament, piece of sports equipment, or the like, located at the supporting portion 28. Drawers will be discussed in detail further below.

When the feature 48 includes a recess, as depicted, the recess may be used to store items, play games, or shelter pets. The recess may be shaped and given the appearance of a goal related to the sport indicated by the sports jersey material used for the cover 34. For example, when hockey jersey material is used, the recess may be made to look like a hockey net and may be shaped to function as a miniature hockey net in a casual game of hockey.

When the feature 48 includes a plush ornament, such an ornament may include the mascot of the team indicated by the sports jersey material, a plush version of sports equipment (e.g., a plush football), and similar. As the chair 20 need not be made to reflect a sport, the plush ornament can include other items, such as a stuffed animal or character, which may appeal to children and may assist in training children to remain seated.

The feature 48 can include a piece of sports equipment, such as a sports ball, netting material, or the like. Such equipment can be modified to include a fastener (e.g., hook-and-loop material, clips, etc) for permanent or removable attachment to the cover 34 at the lower portion 28 or other part of the chair 20.

The feature 48 may be located at the front of the chair 20, as depicted, or on a side or back of the chair 20. Multiple features 48 may be provided at different locations.

Figure 2:
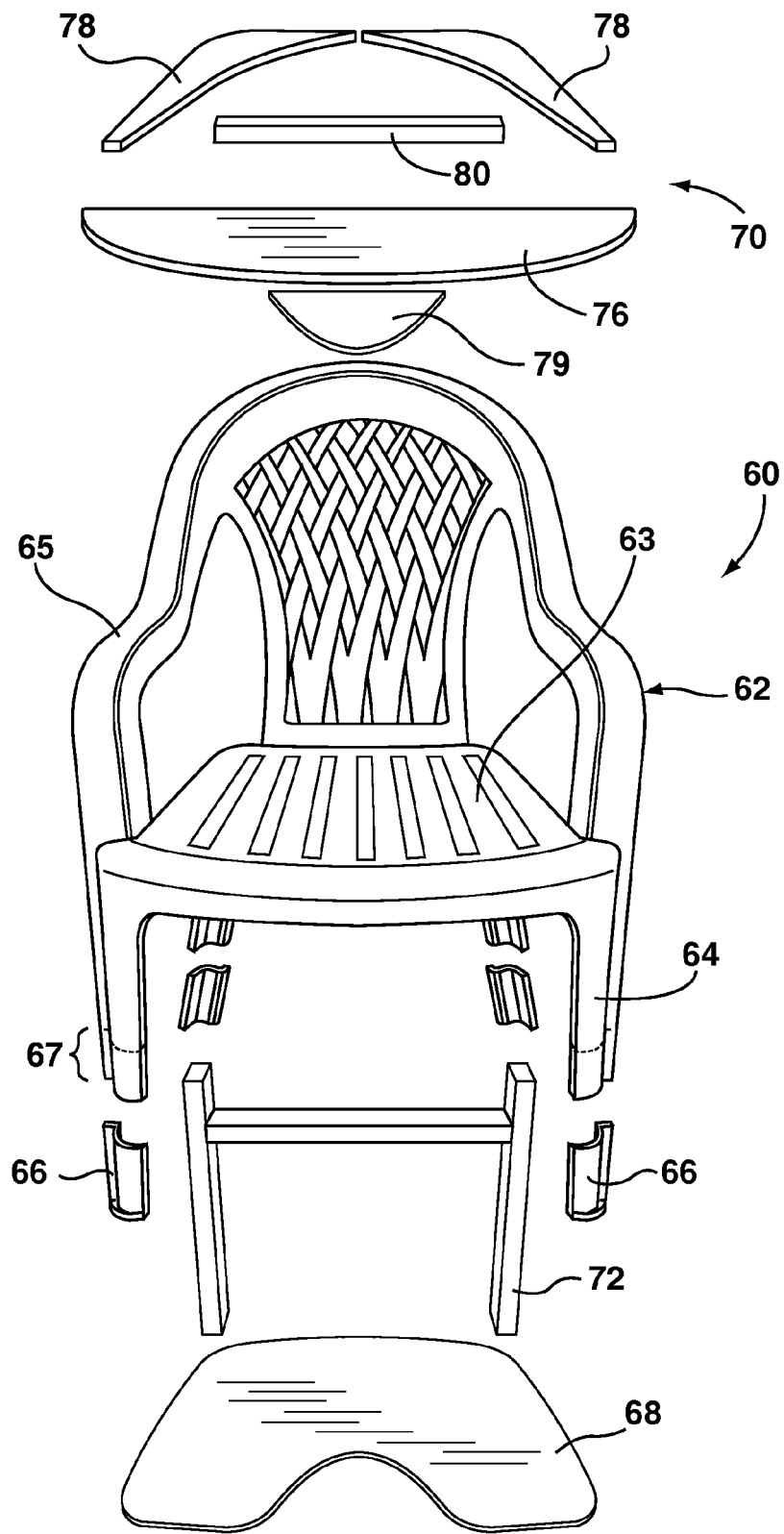
FIG. 2 is an exploded view of a built-up frame for the chair.

FIG. 2 shows an exploded view of a built-up frame 60 for the chair 20. The built-up frame 60 is internal to the chair 20 and defines the basic shape of the chair 20.

Figure 3:
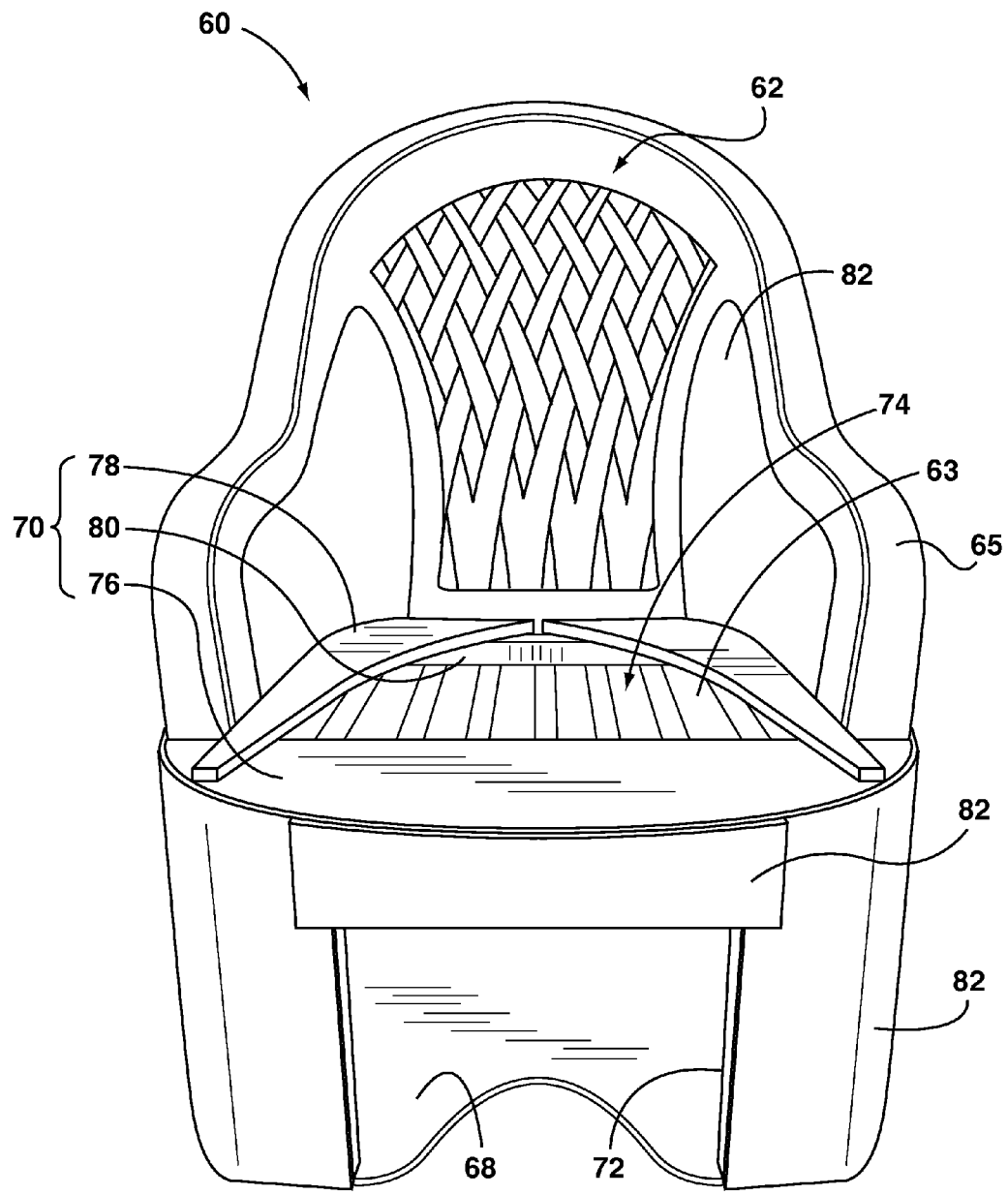
FIG. 3 is a perspective view of the built-up frame assembled.

FIG. 3 shows the built-up frame 60 assembled. The pieces of the frame 60 may be affixed together using screws, staples, nails, adhesive, and like techniques.

The built-up frame 60, in this embodiment, includes a plastic chair 62, which may be a premade plastic chair, such as a plastic lawn or deck chair of the kind commonly available off the shelf. Using an off-the-shelf lawn or deck chair may be advantageous because such chairs are readily available and inexpensive. In addition, using a plastic chair 62 may save forestry resources. Further, many kinds of premade plastic chairs are strong (e.g., some are rated for 300 lbs; 136 kg) and light, and can therefore provide a high strength-to-weight ratio to the chair 20. This can be advantageous when the chair 20 is used by sports fans because the chair 20 has a reduced chance of being damaged by roughhousing and yet is light and easy to reposition to accommodate viewing of sporting events or other activities. It should be noted that the plastic chair 62 need not be a premade or off-the-shelf item and can be custom made with the general properties of off-the-shelf lawn or deck chairs.

When an off-the-shelf plastic lawn or deck chair 62 is used, the legs 64 of the plastic chair 62 may be reinforced by the lower portions 66 of the legs 64 being cut off and then reattached to overlap, at 67, the now new lower portions of the legs 64. Such reattachment can be performed by nesting the cut-off lower portions 66 with the legs 64 and applying screws. This may provide for increased weight capacity and stability of the finished chair 20. When the plastic chair 62 is custom made, the lower portions of the legs may be designed as thickened sections to attain similar reinforcement characteristics.

In other embodiments, the legs 64 are entirely or nearly entirely cut off to facilitate attachment of other kinds of legs or a swivel or rocker base.

The built-up frame 60, in this embodiment, further includes a base 68, a seat reinforcement portion 70, and a front support 72.

The base 68, in this embodiment, is a flat and sturdy piece of material to which the legs 64 of the plastic chair 62 may be affixed. The base 68 may be made of wood, plastic, or other suitable material. In this embodiment, the base 68 is made from a sheet oriented strand board (OSB). The shape, size, and weight of the base 68 can be selected to inhibit the chair 20 from tipping. The weight of the base 68 can be specifically selected by taking into account the lightness of the plastic chair 62, so as to lower the center of gravity of the chair to reduce the risk of tipping while maintaining an overall lightness to the chair 20. In other embodiments, the base 68 includes a swivel or rocker mechanism.

The seat reinforcement portion 70, in this embodiment, is affixed atop the seat 63 and between the armrests 65 of the plastic chair 62. The seat reinforcement portion 70 includes a central recess or opening 74 (FIG. 3) to accommodate cushioning material. The seat reinforcement portion 70 also provides structural reinforcement to the seat 63 of the plastic chair 62 and may be sized to increase the seat area of the finished chair 20 to be larger than the seat area of the plastic chair 62, which may allow for additional cushioning material and increased comfort. The seat reinforcement portion 70 may be made of wood, plastic, or other suitable material. In this embodiment, the seat reinforcement portion 70 is made from several cut pieces 76, 78, 79 of OSB and a wooden board 80 affixed together by screws. The front piece 76 is convexly curved to provide a suitable front edge for comfort, while the rear pieces 78 are concavely curved to define the central recess or opening 74. The front spacer piece 79, which can be obtained from a front cut-out of the base 68, is installed on the bottom side of the front piece 76 to support the front piece 76 on the seat 63 of the plastic chair 62. The front piece 76 overhangs the seat 63 of the plastic chair 62 to provide a larger seating surface. The wooden board 80 is inserted under the rear pieces 78 to support the rear pieces 78 above the seat 63 of the plastic chair 62 to provide a comfortable seat tilt to the finished chair 20, while also increasing the depth of the central recess or opening 74 and the amount of cushioning material that can be accommodated within the central recess or opening 74. The seat reinforcement portion 70 need not be made from separate pieces. In other embodiments, the seat reinforcement portion 70 is made from a single piece of material.

The front support 72, in this embodiment, is positioned between the base 68 and the front piece 76 of the seat reinforcement portion 70. The front support 72 provides additional support for the seat of the finished chair 20, particularly when the front piece 76 of the seat reinforcement portion 70 is sized to overhang the plastic chair 62. The front support 72 may be made of wood, plastic, or other suitable material. In this embodiment, the front support 72 is made from several wooden boards attached together to form an H-shaped frame. When a drawer is provided at the front of the chair 20, the front support 72 may serve to define the opening for the drawer and support hardware such as drawer runners.

As shown in FIG. 3, the built-up frame 60 can further include panelling 82 affixed at the outer extents of the built-up frame 60. The panelling 82 extends vertically between the base 68 and the upper-most edges of the plastic chair 62 (i.e., top of the backrest and armrests) and serves to provide a uniform appearance to the non-seating portions (i.e., back, sides, bottom-front) of the finished chair 20. The panelling 82 need not extend perfectly vertically, but rather extends substantially vertically, where substantially vertically is defined as the direction between the base 68 and the upper regions of the plastic chair 62. Further, when the chair 20 is finished, the panelling 82 is covered by the cover 34, and so the panelling 82 can prevent the cover from becoming stretched or otherwise damaged by external forces applied to the non-seating portions of the finished chair 20. The panelling 82 may be made from high-density fiberboard (HDF) sheet, cardboard, wood veneer, thick fabric, plastic or foam sheet, and the like. The panelling 82 need not provide support to the occupant of the chair, but rather, provides an overall shape to the chair 20 and may further provide structural stiffness to assist in retaining the overall shape of the chair 20.

Figure 4:
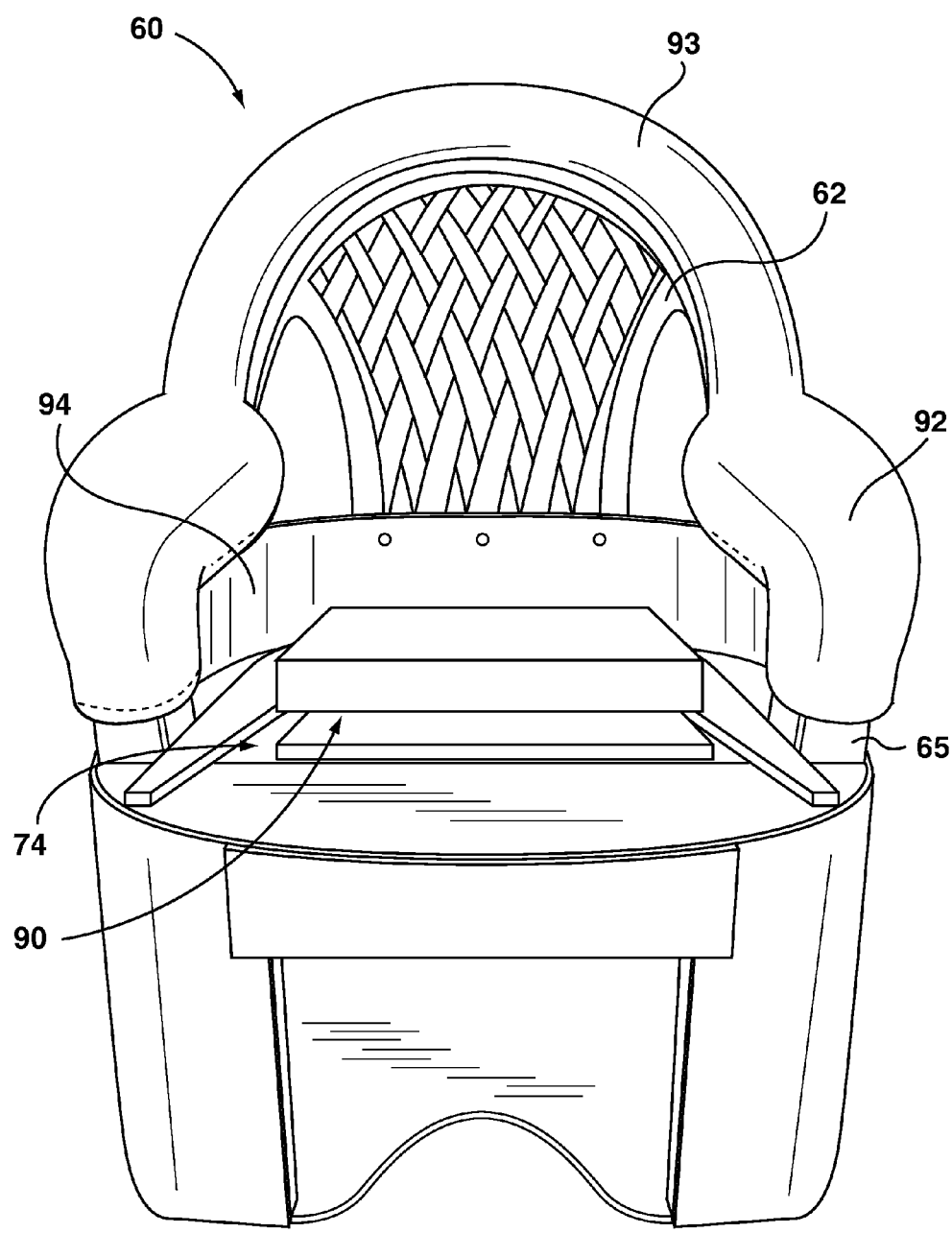
FIG. 4 is a perspective view of the built-up frame with cushioning material in the seat recess.

As shown in FIG. 4, cushioning material 90 can be inserted into the central recess or opening 74 to increase comfort in the finished chair 20. In this embodiment, the cushioning material 90 is provided as two separate pieces. Further, cushioning material 92 is installed over the armrests 65 of the plastic chair 62 and, further, along the top of the backrest, at 93, of the plastic chair 62. Cushioning material can include foam or similar material affixed to the built-up frame 60 by staples, nails, or similar.

Also in this embodiment, a back panel piece 94 can be affixed to the back rest of the plastic chair 62 just above the seat area. The back panel piece 94 is used for securing the cover 34 to the built-up frame 60.

Figure 5:
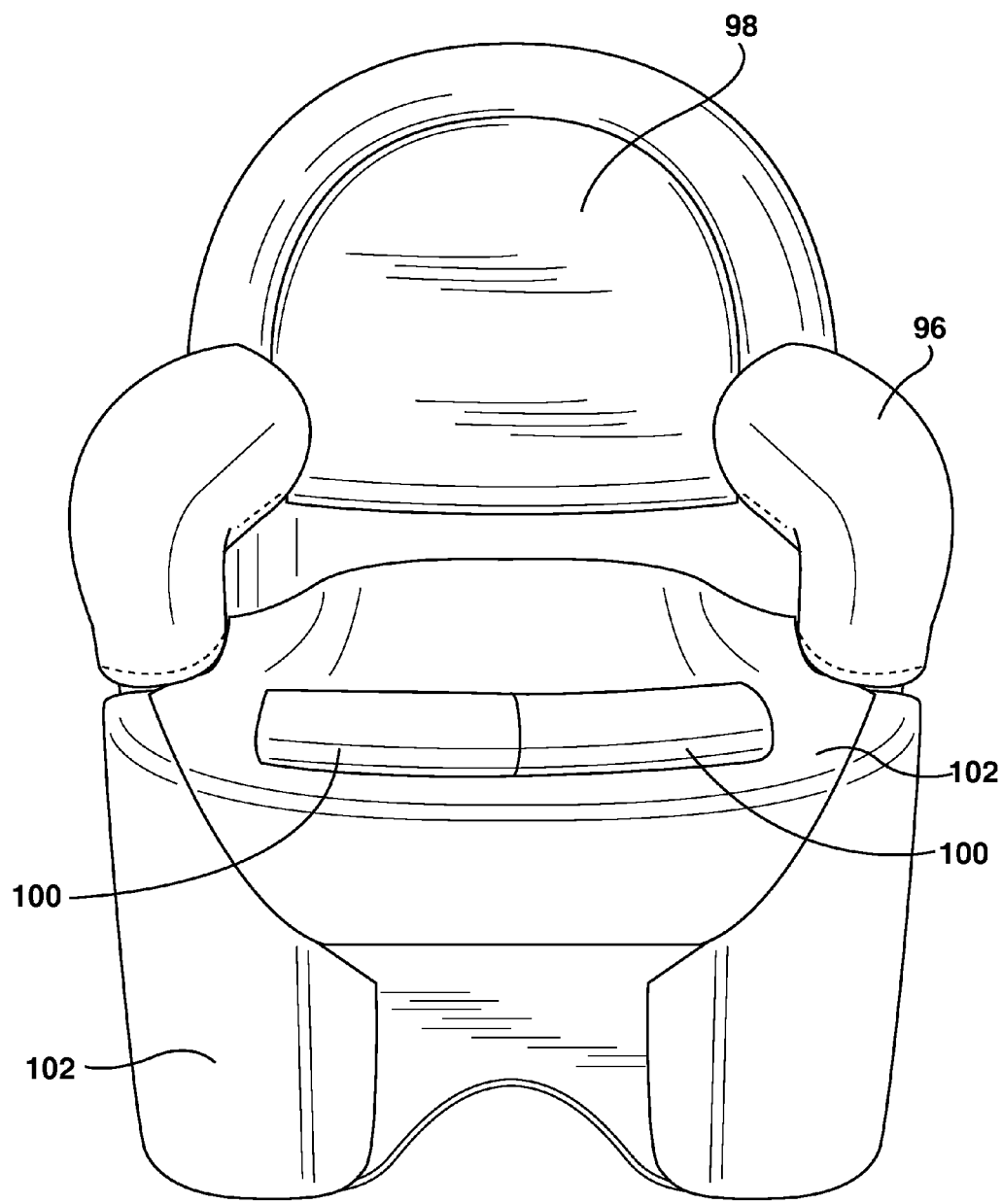
FIG. 5 is a perspective view of the built-up frame with cushioning material installed.

FIG. 5 shows further cushioning material installed over the built-up frame 60. Further cushioning material 96 is added over the armrests 65 and a back cushion 98 is added over the backrest of the plastic chair 62. In addition, cushioning material 100 is added at the front of the seat. Shrouding 102, such as thin foam sheet or fabric, can be installed over the seat and supporting portion of the chair, so as to protect the cover 34 from becoming damaged by contact with the built-up frame 60. Additional shrouding can be installed at other locations where the built-up frame 60 is exposed or where cushioning material is thin.

Figure 5A:
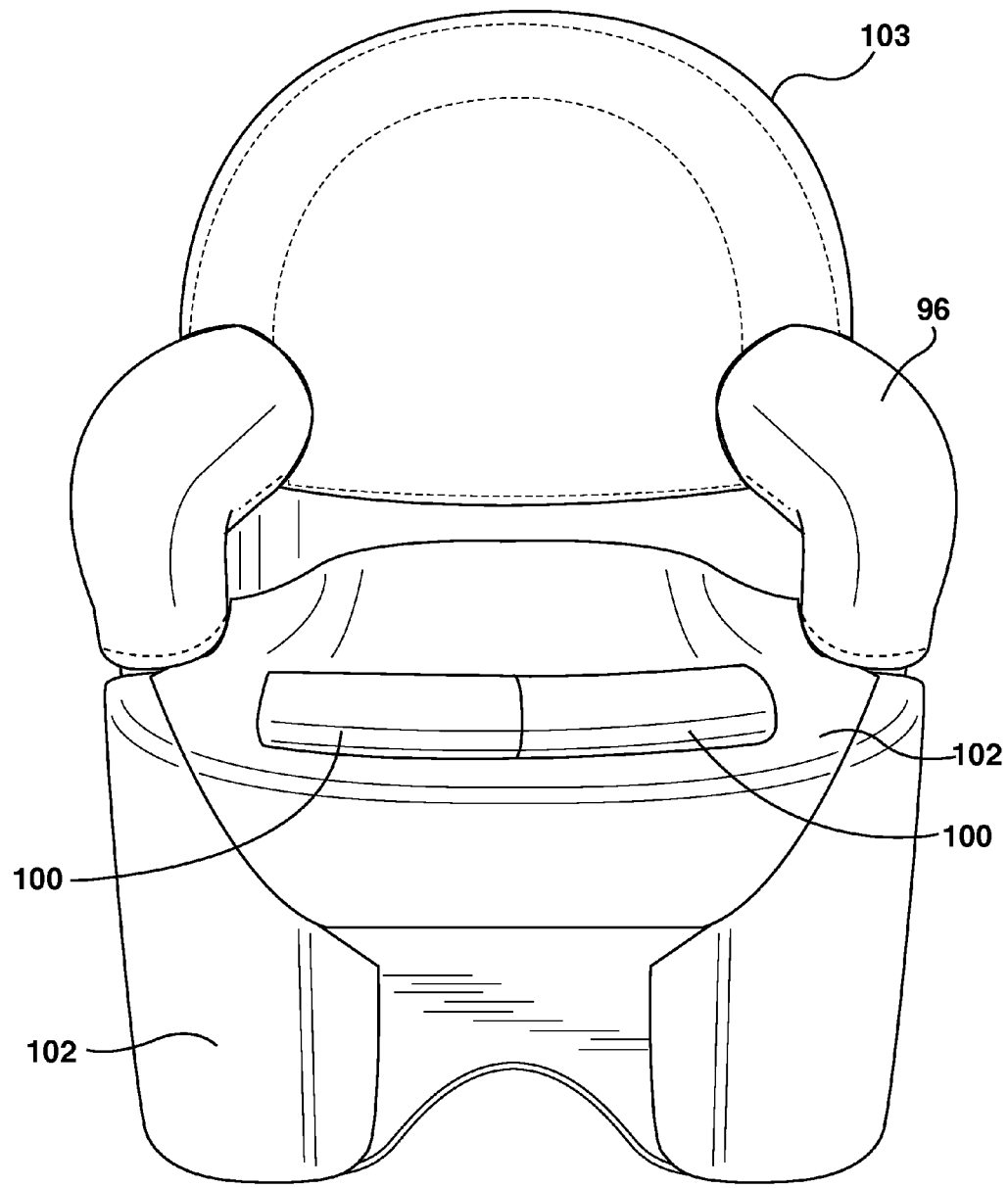
FIG. 5A is a perspective view of further cushioning material installed.

FIG. 5A shows an additional layer of cushioning material 103 installed over the cushioning material 93 and the back cushion 98 and pulled around and stapled to the back of the chair 20 at the back panelling 82.

Figure 6:
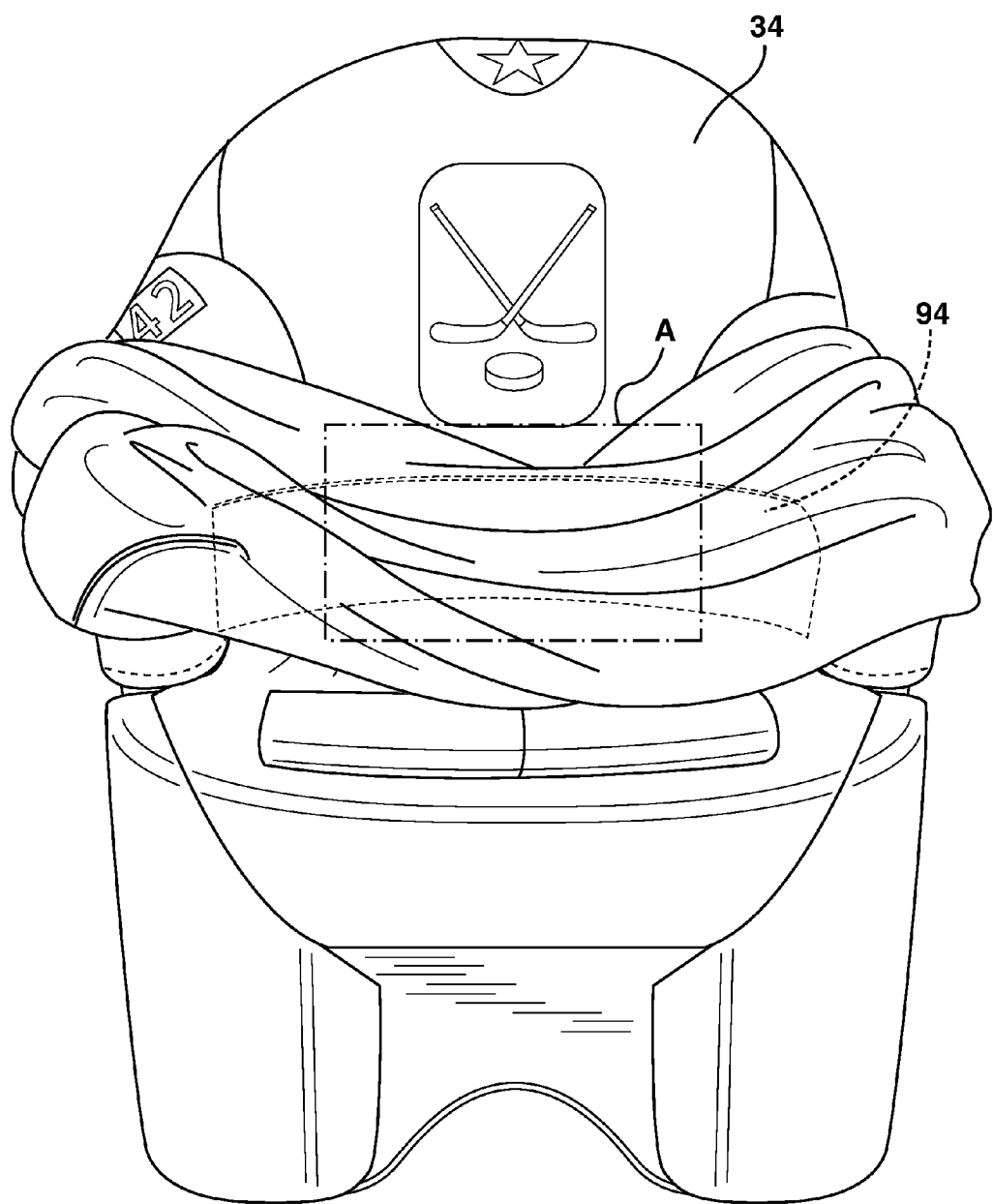
FIG. 6 is a perspective view of the cover being installed.

FIG. 6 shows the cover 34 pulled over the backrest portion of the cushioned frame 60. The back panel piece 94 is shown in hidden line. The cover 34 can be affixed to the back panel piece 94 to secure the cover 34 to the frame 60 and create an apparent seam 104 (FIG. 1). The cover 34 can be permanently affixed to the back panel piece 94 using staples, nails, or similar, or can be removably fastened using clips, hook-and-loop material (e.g., Velcro), a zipper, a drawstring, or other type of temporary fastener.

Figure 7:
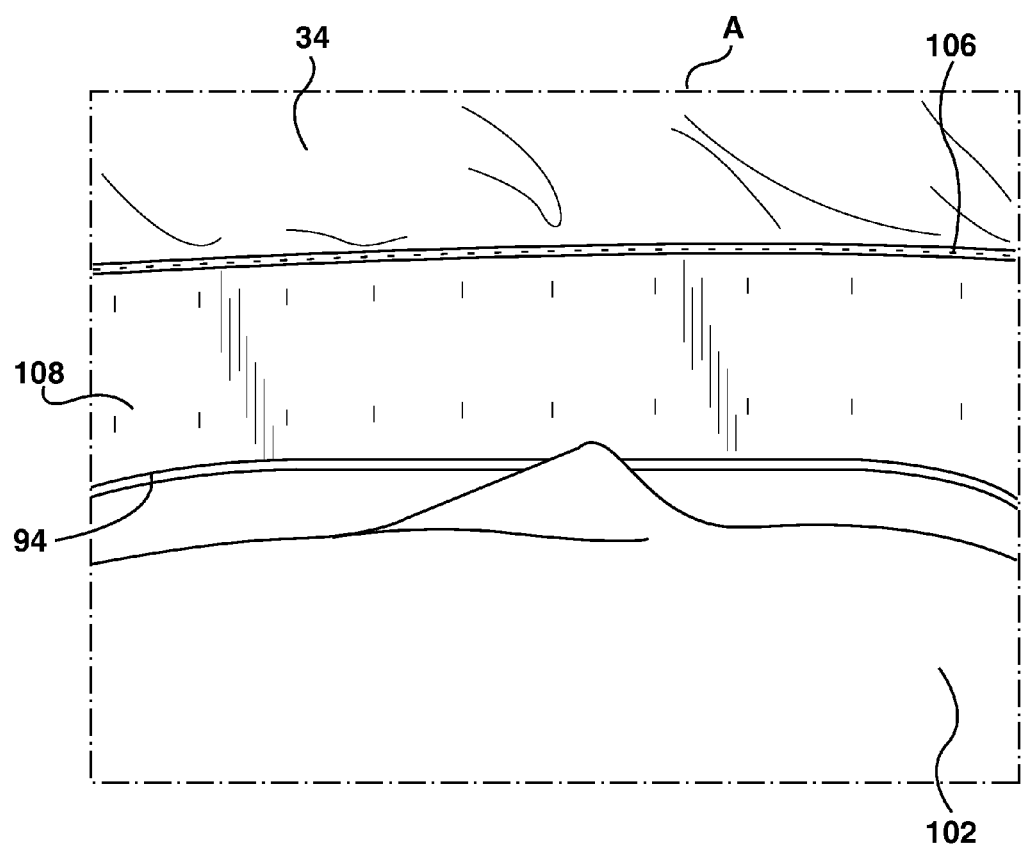
FIG. 7 is a close-up view of region "A" of FIG. 6 showing the cover being attached to the frame.

With reference to FIG. 7, in this embodiment, the cover 34 is permanently stapled, at 106, to the back panel piece 94, which is covered by a piece of protective fabric 108 to prevent the back panel piece 94 from damaging the cover 34. The cover 34 is stapled at an inside seam or fold. This can help prevent the cover 34 from inadvertently becoming misaligned with or removed from the frame 60 when the chair 20 is in use. In addition, as mentioned, attaching the cover 34 in this way also creates the appearance of a seam 104 (FIG. 1) which can increase the aesthetic appearance of the finished chair 20.

Figure 8:
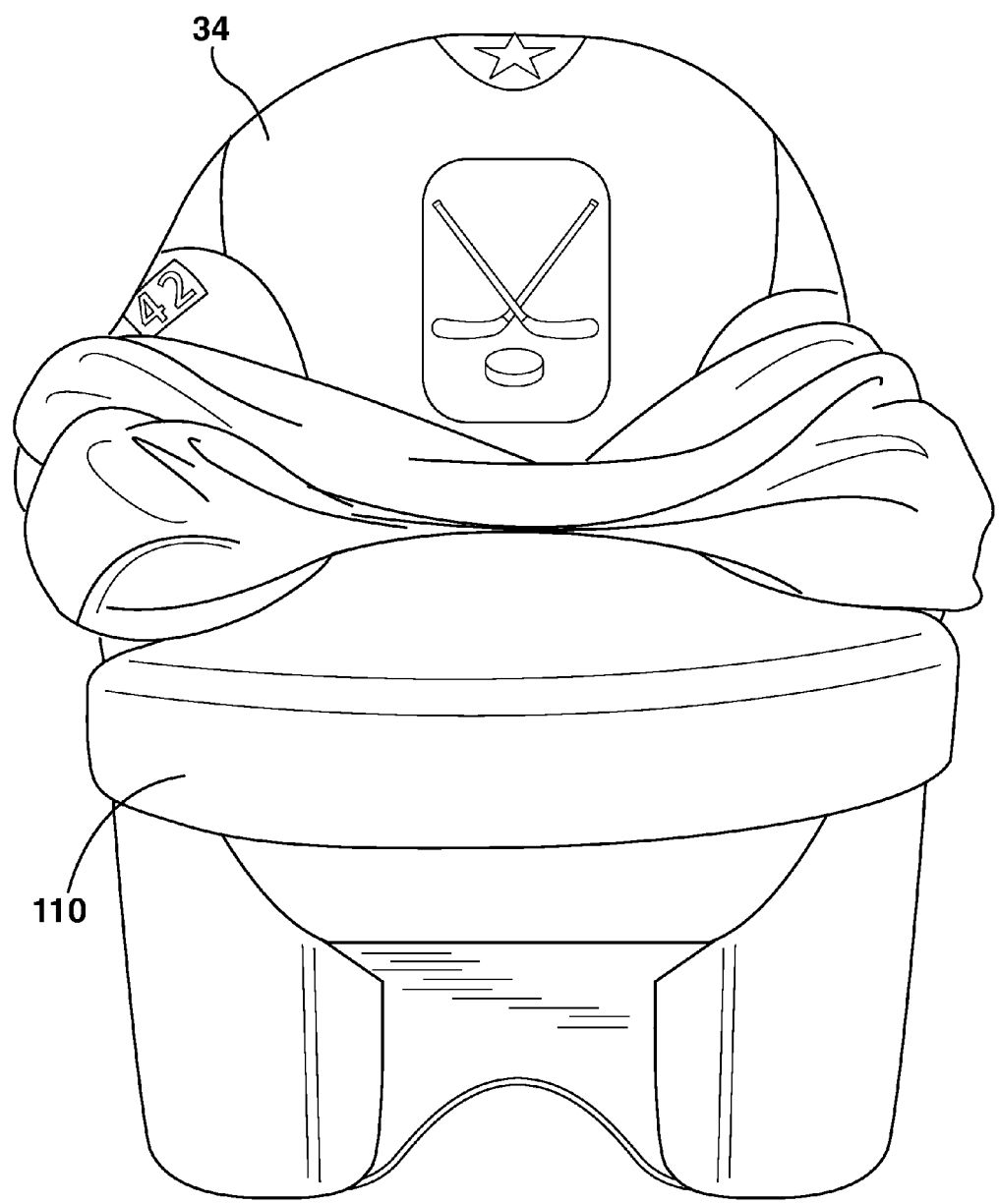
FIG. 8 is a perspective view of the seat cushion being installed.

As shown in FIG. 8, after the cover 34 is affixed to the back panel piece 94, a seat cushion 110 is inserted under the cover 34. The seat cushion 110 can be made of foam or other material. The seat cushion 110 may be affixed in place by staples, adhesive, or similar, or may be held in place by the cover 34. The seat cushion 110 is inserted at this stage, so as to simplify the procedure for attaching of the cover 34 to the back panel piece 94.

Figure 9:
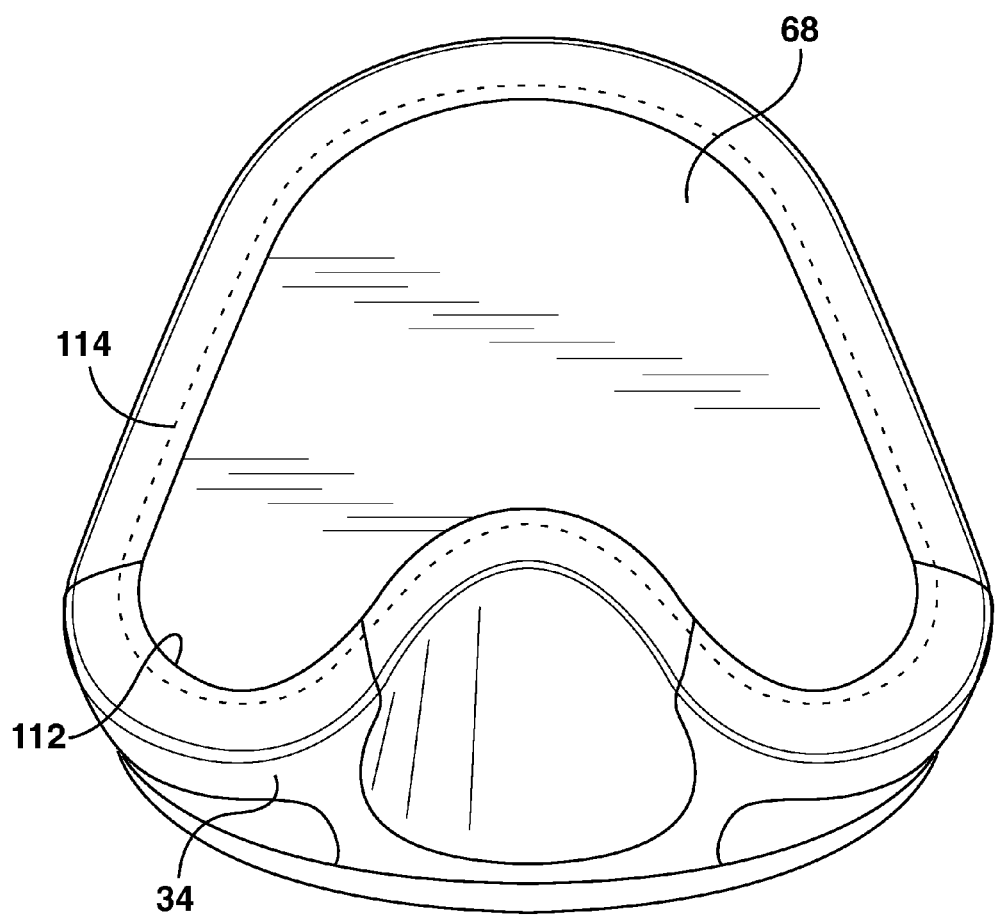
FIG. 9 is a perspective view of the chair turned upside-down showing the cover being attached to the base.

As shown in FIG. 9, the cover 34 is then drawn over the remainder of the chair 20, which can then be turned upside-down to permit affixing the opening edge 112 of the cover 34 to the base 68. In this embodiment, staples 114 are used to affix the cover 34 to the base 68.

Figure 10:
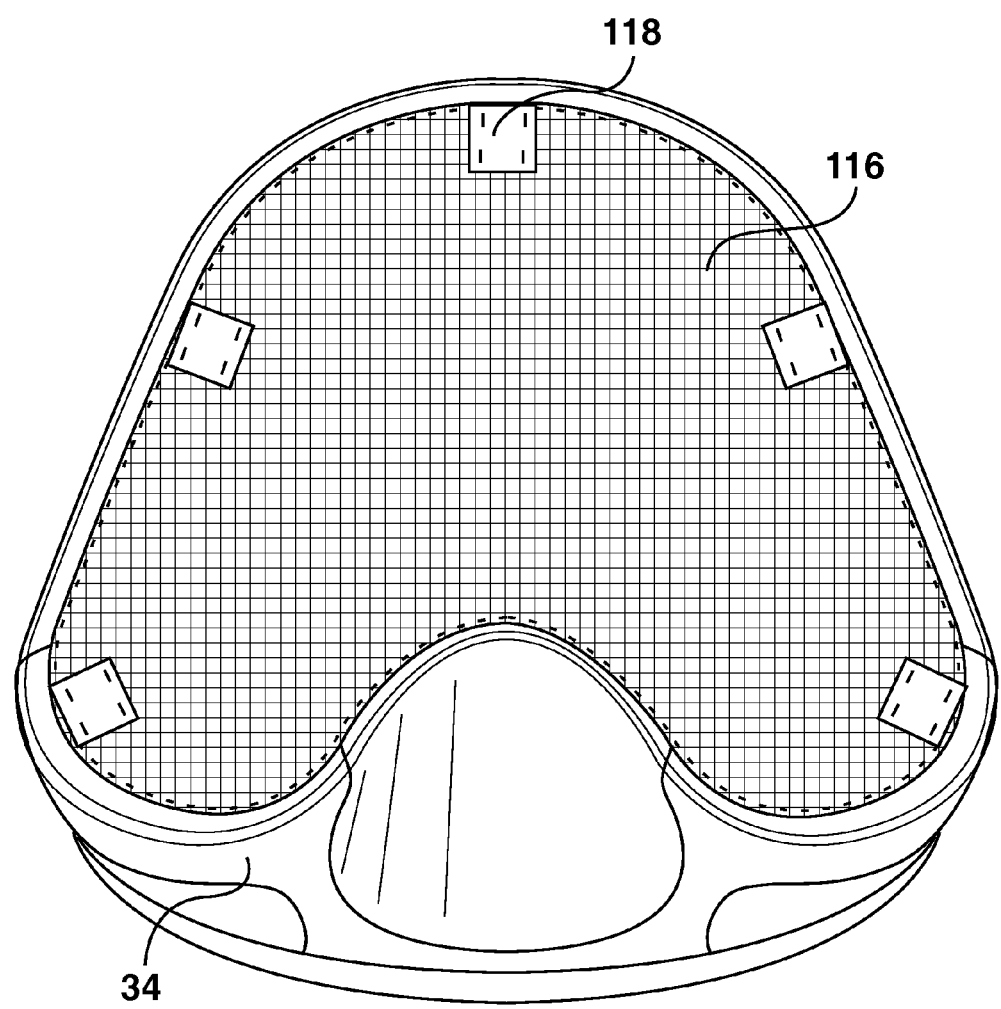
FIG. 10 is a perspective view of the chair turned upside-down showing feet installed.

FIG. 10 shows a bottom layer of finishing fabric 116 installed over the opening edge 112 of the cover 34. Feet 118, such as pieces of soft, low-friction material (e.g., thick fabric), are then affixed to the base 68. In other embodiments, the feet 118 can be caster wheels, peg feet, ornate legs made of wood, plastic, or other material. In still other embodiments, the bottom of the chair can be provided with a swivel or rocker instead of feet.

Figure 10A:
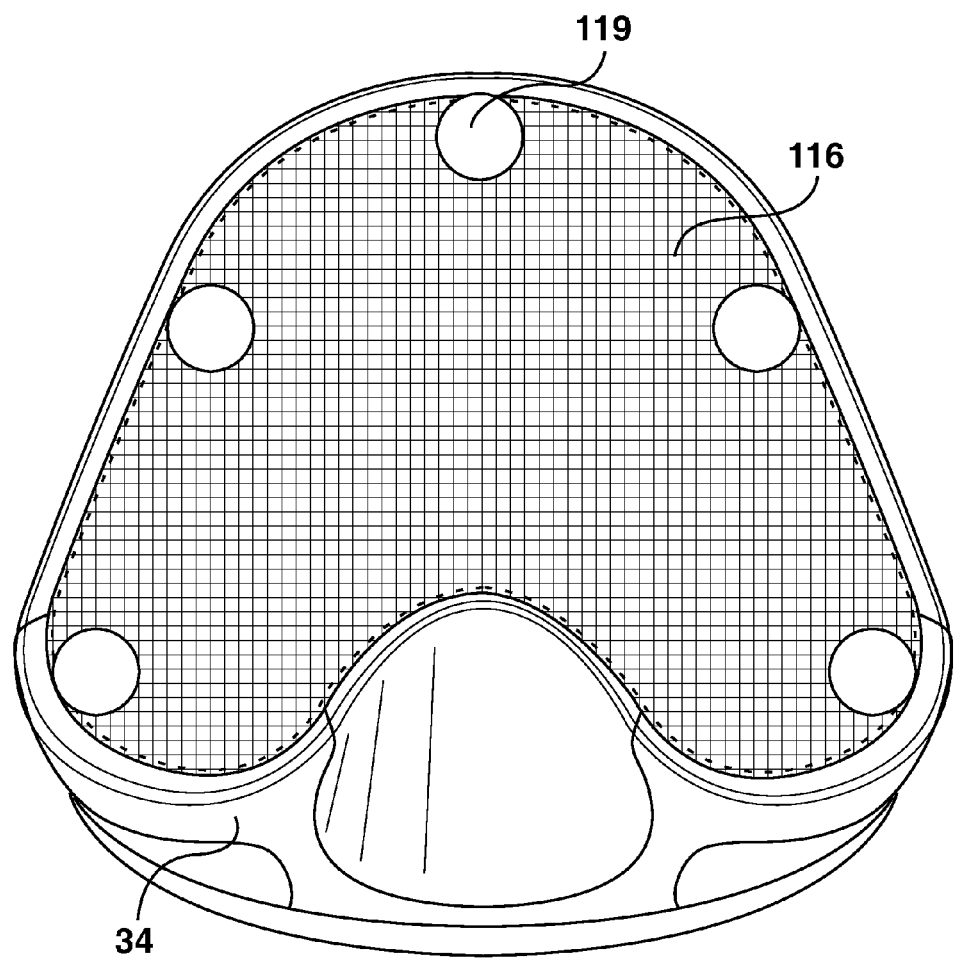
FIG. 10A is a perspective view of the chair turned upside-down showing hockey pucks installed as feet.

As shown in FIG. 10A, in some embodiments, sports equipment or pieces thereof can be used as feet 119. In this example, hockey pucks are affixed (e.g., via screws) to the base 68 of the chair 20 to support the chair 20.

Figure 11:
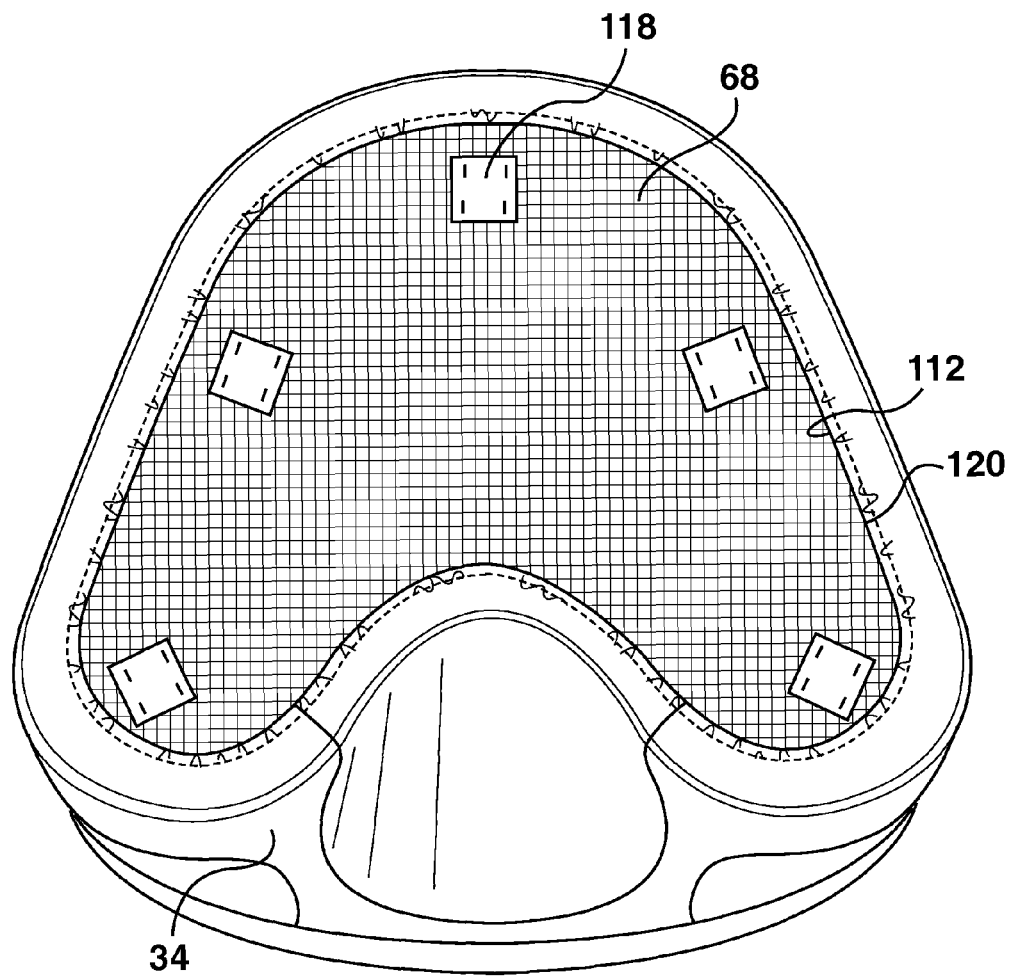
FIG. 11 is a perspective view of the chair turned upside-down showing a slip cover.

FIG. 11 shows that, according to another embodiment, the cover 34 may be a removable slip cover provided with an elastic 120 sewn inside a seam at the opening edge 112 of the cover 34. In other embodiments, a drawstring can be inserted into the seam rather than the elastic. This can advantageously permit the cover 34 to be removed easily without tools, so that the cover 34 may be machine laundered or replaced with a new or different cover. In this embodiment, the cover 34 is not affixed to the frame 60 at 106 (FIG. 7) or is attached to the frame 60 at 106 using temporary fasteners, so as to allow the slip cover 34 to be removed without tools. The slip cover 34 can be removably attached to the chair 20 by temporary fasteners such as one or more zippers, hook-and-loop fasteners (e.g., Velcro), clips, or similar.

Figure 11A:
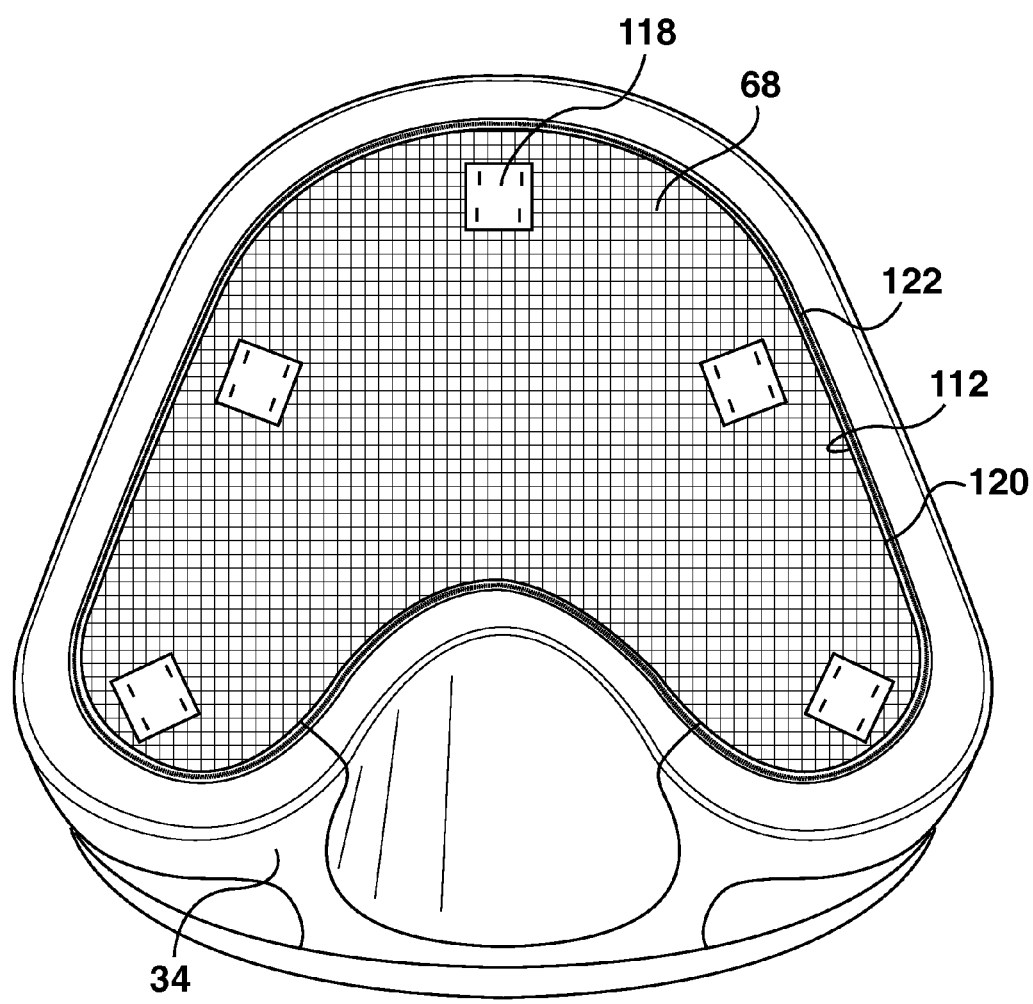
FIG. 11A is a perspective view of the chair turned upside-down showing a slip cover removably attached to the chair using a zipper.

FIG. 11A shows a zipper 122 attaching the slip cover 34 to the chair 20. One side of the zipper 122 can be sewn to the opening edge 112 of the cover 34, while the other side of the zipper 122 can be sewn to finishing fabric installed over the base 68. The cover 34 can then be attached and removed by zipping and unzipping the zipper 122.

Construction of the chair 20 can follow the general sequence shown in FIGS. 2-11A or another suitable sequence. First, the frame is built up over at least a portion of a plastic lawn or deck chair (FIGS. 2 and 3). Then, cushioning material is installed over the built-up frame (FIGS. 4, 5, 5A, 8). The cover is then installed over the cushioning material and the bottom of the chair is finished (FIGS. 6-11A).

Figure 12:
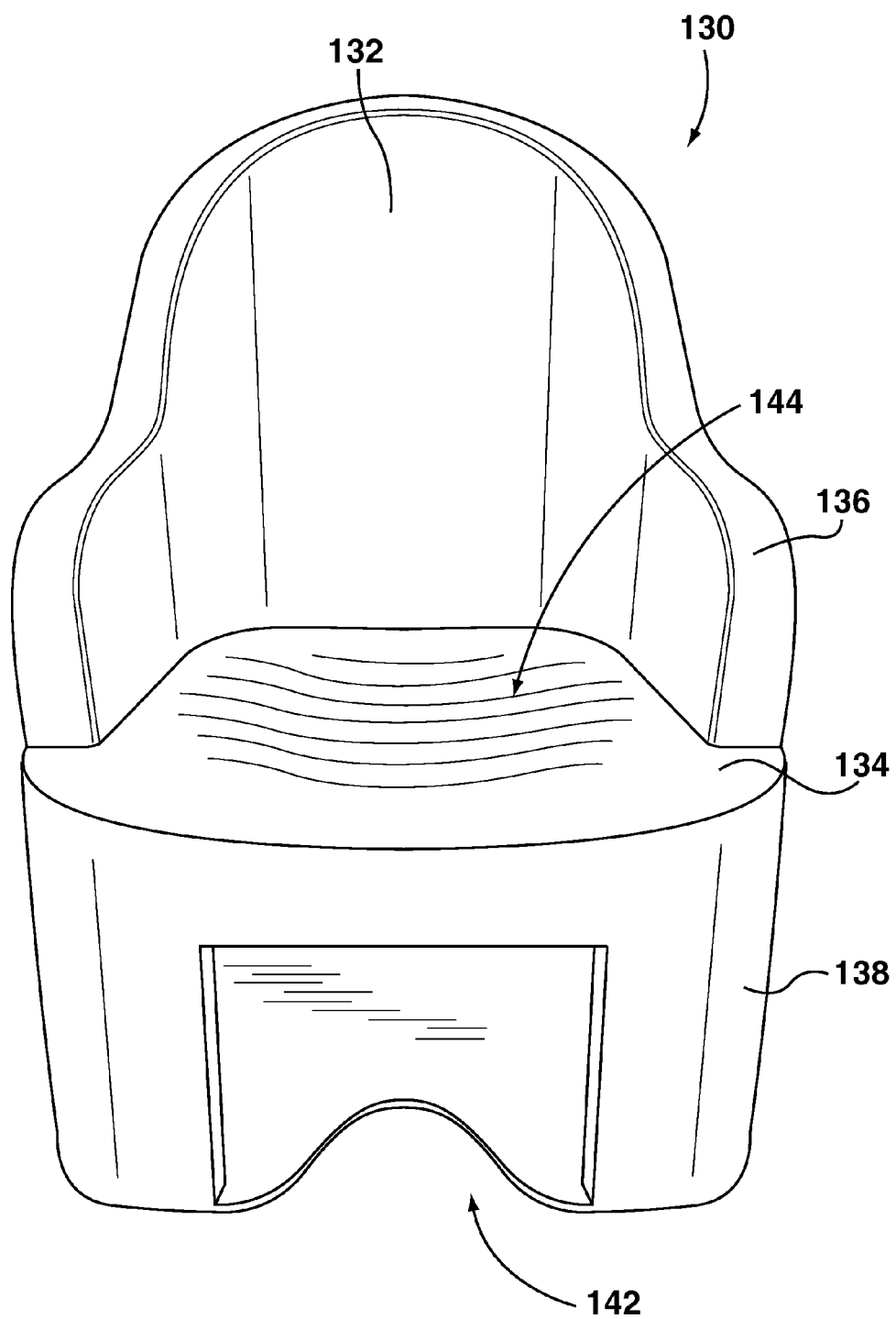
FIG. 12 is a perspective view of a frame according to another embodiment.

FIG. 12 shows another embodiment of a frame 130 for the chair 20. The frame 130 can be used in place of the frame 60. The frame 130 can include a backrest 132, a seat 134, armrests 136, and a lower supporting portion 138. The lower supporting portion 138 is sized and shaped to support the seat 134 and a person therein. The lower supporting portion 138 may include a recess or opening 142 for providing a drawer or other feature to the chair 20. The seat 134 may include a dished recess 144 for receiving cushioning material for comfort. In some embodiments, the frame 130 is substantially the same as the built-up frame 60, except that the frame 130 is made as a unitary structure from material such as plastic. In such embodiments, the one or more pieces of the frame 130 can be blow molded, injection molded, or made with similar techniques. The frame 130 can therefore be light and strong, yet simple and relatively easy to mass produce.

Figure 13:
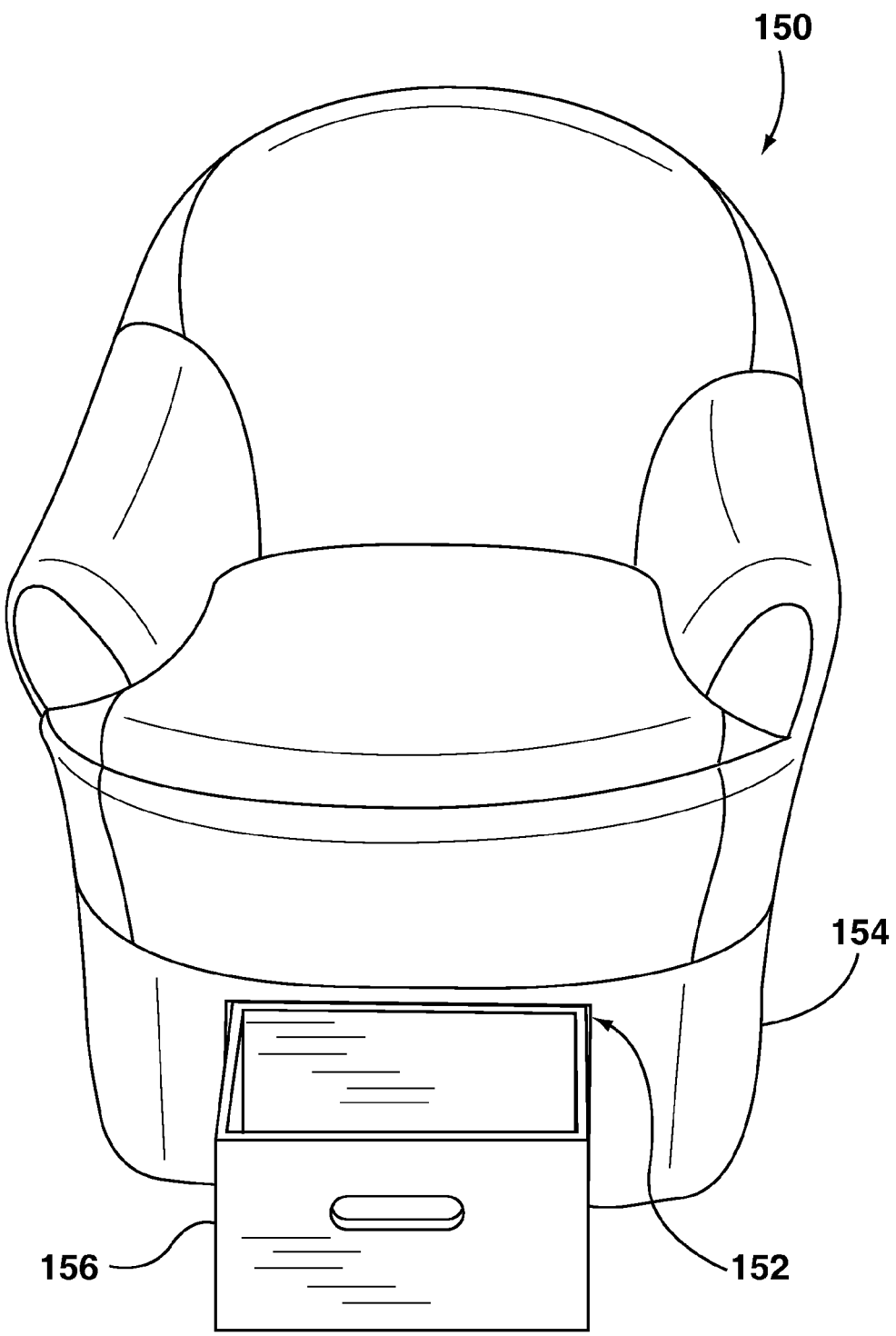
FIG. 13 is a perspective view of another embodiment of a chair with a front drawer.

FIG. 13 shows a chair 150 according to another embodiment. The chair 150 is similar to the chair 20 and only differences will be discussed in detail. For other features, the description for the chair 20 can be referenced. The chair 150 includes an opening 152 in a lower supporting portion 154. The opening is sized and shaped to receive a sliding drawer 156. In this embodiment, the opening 152 is positioned on the front of the lower supporting portion 154. The chair 150 can include a front support (e.g., front support 72 of FIG. 2) to define the opening 152 and affix runners, if used, for the drawer 156.

Figure 14:
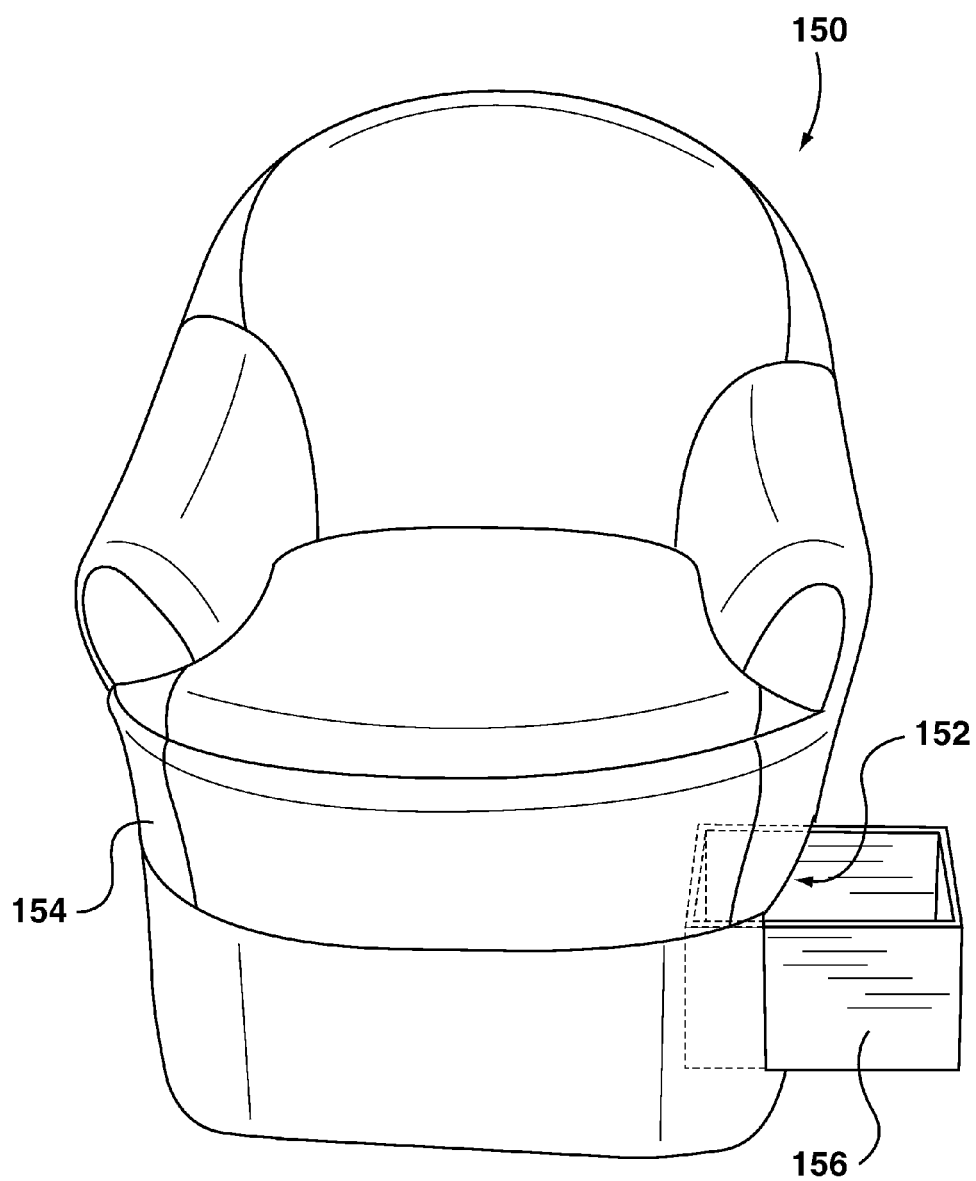
FIG. 14 is a perspective view of another embodiment of a chair with a side drawer.

FIG. 14 shows an embodiment of the chair 150 with the drawer 156 in the side of the lower supporting portion 154. In other embodiments, the drawer 156 can be provided at other locations, such as the back. In some embodiments, more than one drawer 156 is provided.

In the chair 150, when a plastic portion with legs, such as the plastic chair 62 (FIG. 2), is used for the frame, the drawer 156 is disposed between two of the legs. This can advantageously allow for efficient use of space.

Figure 15:
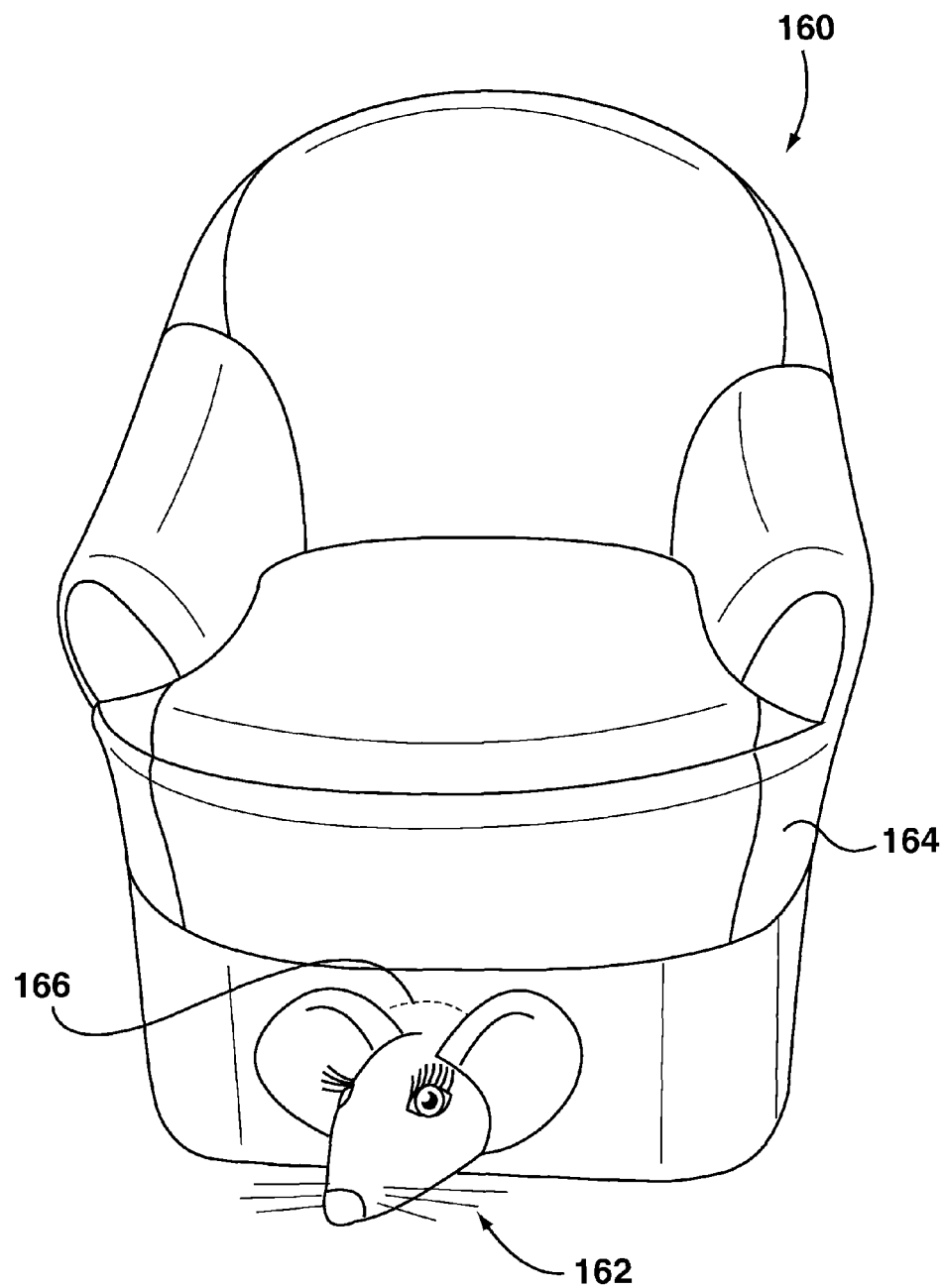
FIG. 15 is a perspective view of another embodiment of a chair with a plush ornament.

FIG. 15 shows a chair 160 according to another embodiment. The chair 160 is similar to the chair 20 and only differences will be discussed in detail. For other features, the description for the chair 20 can be referenced. The chair 160 includes a plush ornament 162 affixed to the lower supporting portion 164 of the chair 160 using stitching 166, fasteners, or the similar. Characteristics and advantages of such a plush ornament 162 are described above with reference to FIG. 1. In other embodiments, the plush ornament 162 can be provided at other locations, such as the side or back of the lower supporting portion 164. In some embodiments, more than one plush ornament 162 is provided. The plush ornament 162 may be affixed (e.g., sewn) to the chair 160 or attached in a removable manner using hook-and-loop material (e.g., Velcro), clips, or similar temporary fastener.

Figure 16:
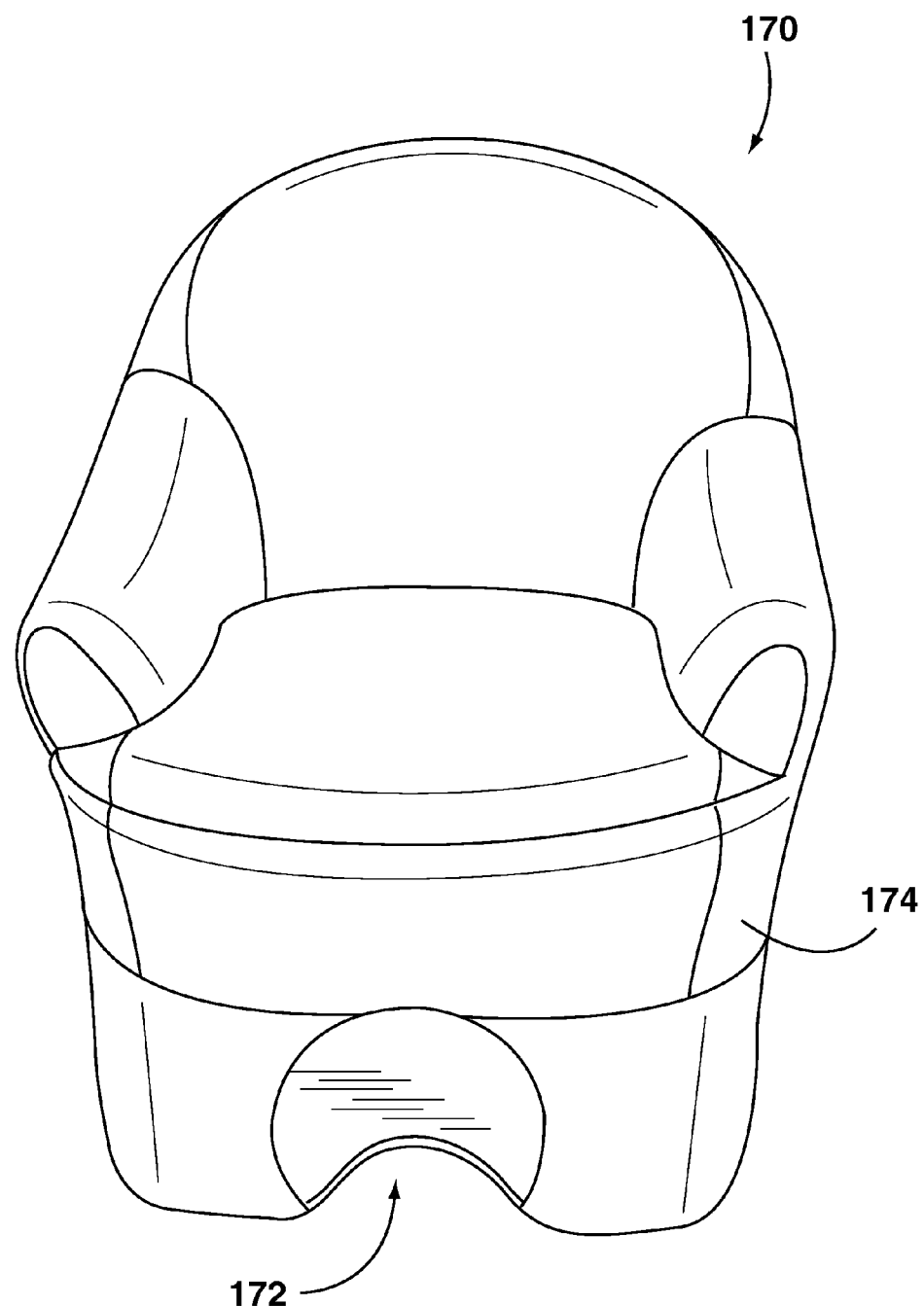
FIG. 16 is a perspective view of another embodiment of a chair with recess in the lower portion.

FIG. 16 shows a chair 170 according to another embodiment. The chair 170 is similar to the chair 20 and only differences will be discussed in detail. For other features, the description for the chair 20 can be referenced. The chair 170 includes a recess 172 in the lower supporting portion 174 of the chair. Characteristics and advantages of such a recess 172 are described above with reference to FIG. 1. In other embodiments, the recess 172 can be provided at other locations, such as the side or back of the lower supporting portion 174. In some embodiments, more than one recess 172 is provided, and such recesses may be separate or may be connected inside the lower supporting portion 174.

Figure 17:
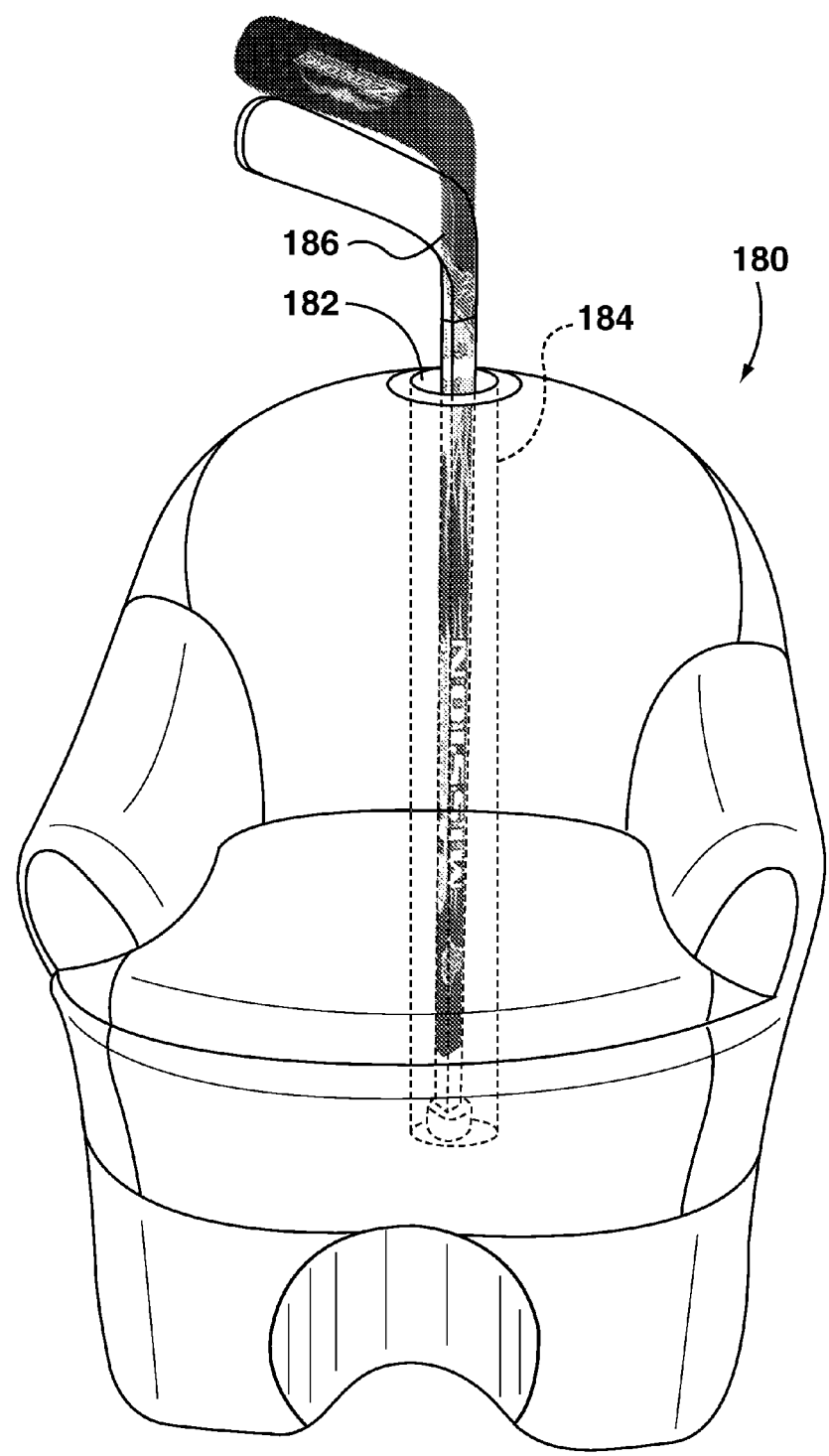
FIG. 17 is a perspective view of another embodiment of a chair with an opening at the backrest for displaying sports equipment.

FIG. 17 shows a chair 180 according to another embodiment. The chair 180 is similar to the chair 20 and only differences will be discussed in detail. For other features, the description for the chair 20 can be referenced. The chair 180 includes a sports equipment holder than has an opening 182 in the top of the backrest. The opening 182 opens into a hollow tube 184 positioned inside the backrest. The hollow tube 184 may be made of plastic or other material and may be situated between the backrest of the plastic chair 62 and the back panelling 82 (see FIGS. 2 and 3). The hollow tube 184 may be affixed in place by straps, screws, staples, or the like. A piece of sports equipment 186, such as a hockey stick, baseball bat, golf club, tennis racquet, or the like, may be inserted into the opening 182 and held in position by the hollow tube 184. This can allow the chair 180 to display the piece of sports equipment 186.

Figure 18:
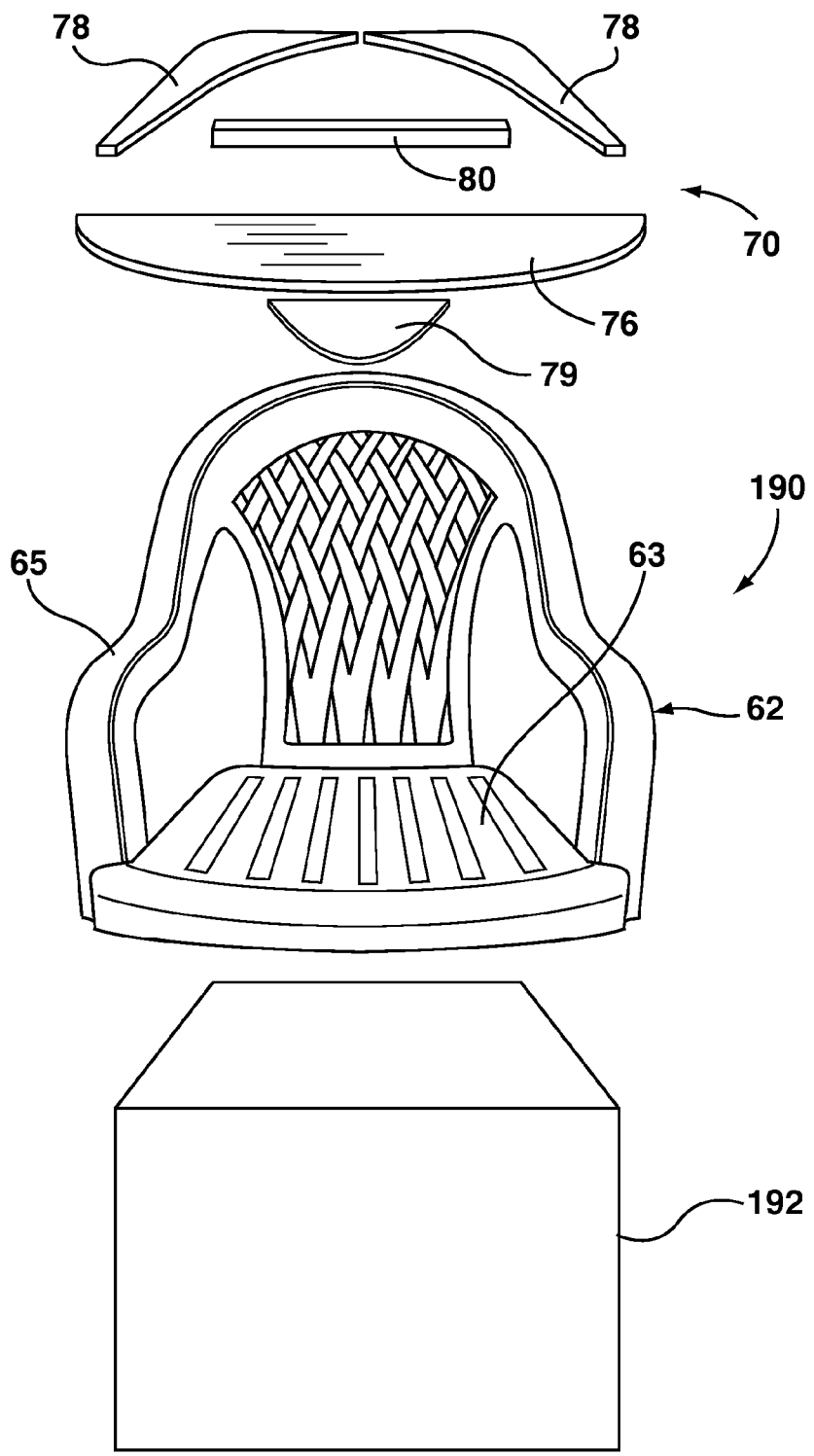
FIG. 18 is a perspective view of another embodiment of a chair frame.

FIG. 18 shows a chair frame 190 according to another embodiment. The frame 190 is similar to the frame 60 (FIGS. 2 and 3) and only differences will be discussed in detail. For other features, the description for the frame 60 can be referenced. The frame 190 includes a plastic chair 62 that has the entire length or nearly the entire length if its legs removed (or omitted in the case of a custom-made plastic chair). A structural base 192, such as a stationary box or rocker mechanism, can be attached to the bottom of the legless chair 62 to support the finished chair 20 above the ground. When a stationary box is used, the box can include openings for drawers or other storage.

It should be apparent from the above that the present invention provides a chair or other piece of furniture that may have one or more of the advantages of light weight, high strength and weight capacity, high strength-to-weight ratio, efficient construction, a construction that readily permits providing a feature at a lower portion near the floor, a durable cover, a removable slip cover, a cover that is readily made from a sports jersey.

In further embodiments, aspects described herein are used in a conventional chair that does not include a plastic frame portion, such as a premade plastic chair. For instance, the slip cover 34 can be applied to such a chair. Further, the drawer, recess, plush ornament, piece of sports equipment, or other feature can each be applied to a chair that does not include a plastic frame portion. In addition, the sports equipment feet and/or sports equipment holder with the opening at the backrest can also be applied to a chair that does not include a plastic frame portion.

Further, it is noted that this disclosure is not limited to furniture to display sports jerseys and sports equipment. For example, the teachings of this disclosure can be used to make a bedroom-style chair with suitable cover material and legs, without the use of a sports jersey or sporting equipment. Moreover, different, non-jersey materials can be used for the cover, such as sports jackets (e.g., varsity jackets), tracksuits, T-shirts, and the like.

While the foregoing provides certain non-limiting example embodiments, it should be understood that combinations, subsets, and variations of the foregoing are contemplated. The monopoly sought is defined by the claims.

What is claimed is:

1. A piece of furniture for seating at least one person comprising:
   a frame having:
     a flat base for resting on a floor;
     a seat shaped to accommodate the at least one person;
     plastic legs connected to the seat and connected to the base, the plastic legs for supporting the at least one person;
     a backrest positioned at a rear of the seat and extending upwards from the seat;
     a front piece extending forward from the seat, the front piece having a convexly curved front edge;
     front and side paneling positioned at outer extents of the frame, extending vertically from the convexly curved front edge to the base, and extending around at least a portion of a front of the piece of furniture and sides of the piece of furniture, the front and side paneling providing structural stiffness to assist in retaining an overall shape of the piece of furniture;
     a front support connecting the base to the convexly curved front edge of the front piece between a forward pair of the plastic legs, the front support for providing additional support to the seat and defining an opening or recess in the front paneling;
   cushioning material installed over the seat, the front piece, and the backrest; and
   a cover installed over the cushioning material.

2. The piece of furniture of claim 1, wherein the frame comprises a plastic lawn or deck chair.

3. The piece of furniture of claim 1, wherein the base is one or more of wider and deeper than the seat and has a weight that inhibits tipping of the piece of furniture.

4. The piece of furniture of claim 1, wherein the cover is affixed to a bottom of the base.

5. The piece of furniture of claim 1, wherein the frame further comprises a seat reinforcement portion affixed atop the seat, the seat reinforcement portion defining a central recess or opening, the seat reinforcement portion including the front piece and at least one rear piece, the front and rear pieces affixed atop the seat and spaced apart to define the central recess or opening.

6. The piece of furniture of claim 1, wherein lower portions of the plastic legs of the frame are reinforced by portions shaped as the lower portions of the plastic legs.

7. The piece of furniture of claim 1, wherein the cover is a removable slip cover.

8. The piece of furniture of claim 7, wherein the cover is removably attached using temporary fasteners.

9. The piece of furniture of claim 1, wherein the cover is made from sports jersey material.

10. The piece of furniture of claim 9, wherein the cover is made from stock unstitched jersey pieces.

11. The piece of furniture of claim 1, further comprising a drawer disposed in an opening defined by the front support between the forward pair of the plastic legs.

12. The piece of furniture of claim 1, further comprising a plush ornament affixed to a supporting portion of the piece of furniture.

13. The piece of furniture of claim 1, further comprising a recess defined by the front support between the forward pair of the plastic legs.

14. The piece of furniture of claim 1, wherein an exterior of the cover comprises at least one pocket.

15. The piece of furniture of claim 1, further comprising feet attached to a bottom of the base, the feet comprising sports equipment.

16. The piece of furniture of claim 1, further comprising an opening at the backrest to receive a piece of sports equipment.

17. The piece of furniture of claim 1, further comprising back paneling extending vertically from a top of the backrest to the base, the back paneling providing structural stiffness to assist in retaining an overall shape of the piece of furniture.

18. A piece of furniture for seating at least one person comprising:
   a frame of rigid plastic structure and being non-collapsible and non-folding, the frame having:
     a plastic seat shaped to accommodate at least one seated person, the plastic seat having a convexly curved front edge;
     a plastic backrest extending upwards from the seat;
     plastic support legs connected to the seat for supporting the seat above a floor;
     front and side portions positioned at outer extents of the frame, extending vertically from the convexly curved front edge to the floor; and
     a front support for supporting the convexly curved front edge of the plastic seat between a forward pair of the plastic support legs, the front support capable of defining an opening or recess in the front portion;
   cushioning material installed over the plastic seat and plastic backrest; and
   a cover installed over the cushioning material.

19. The piece of furniture of claim 18, wherein the cover is a removable slip cover.

20. The piece of furniture of claim 18, wherein the cover is made from stock unstitched jersey pieces.

21. A piece of furniture for seating at least one person comprising:
   a molded plastic frame including:
     a seat shaped to accommodate at least one seated person, the seat having a central dished recess for seating the at least one seated person, the seat having a convexly curved front edge;
     a backrest extending upwards from the seat;
     a base for resting on a floor;
   a lower supporting portion connecting the seat to the base to support the seat above the floor, the lower supporting portion extending vertically from the convexly curved front edge to the base;
   a front support for supporting the convexly curved front edge of the seat, the front support capable of defining an opening or recess in the lower supporting portion;
   cushioning material installed over the seat, in the central dished recess, and over the backrest; and
   a fabric cover installed over the cushioning material and over substantially all of the molded plastic frame.

22. The piece of furniture of claim 21, wherein the fabric cover is made from stock unstitched jersey pieces.

23. The piece of furniture of claim 21, wherein the fabric cover is made from one or more of a jacket, a T-shirt, and a tracksuit.

* * * * *